United States Patent [19]
Yamamoto et al.

[11] Patent Number: 5,636,073
[45] Date of Patent: Jun. 3, 1997

[54] METHODS AND APPARATUS FOR EDITING AND RECORDING AUDIO AND/OR VIDEO SIGNALS REPRODUCED FROM PLURAL SOURCES

[75] Inventors: Tomoyuki Yamamoto; Masafumi Matsui, both of Kanagawa, Japan

[73] Assignee: Sony Corporation, Tokyo, Japan

[21] Appl. No.: 417,280

[22] Filed: Apr. 5, 1995

Related U.S. Application Data

[63] Continuation of Ser. No. 113,802, Aug. 31, 1993, abandoned.

[30] Foreign Application Priority Data

Sep. 4, 1992 [JP] Japan .................................. 4-237242

[51] Int. Cl.$^6$ ............................................ G11B 27/024
[52] U.S. Cl. ........................................ 360/13; 386/55
[58] Field of Search ............................ 360/13, 14.1, 15, 360/14.2; 369/84–85; 395/154, 157; 386/55, 54, 52, 53, 4

[56] References Cited

U.S. PATENT DOCUMENTS

| | | | |
|---|---|---|---|
| 4,807,060 | 2/1989 | Takahashi et al. | 360/72.2 |
| 5,060,087 | 10/1991 | Nishijima et al. | 360/14.1 |
| 5,182,677 | 1/1993 | Kizu et al. | 360/14.2 |
| 5,239,420 | 8/1993 | Choi | 360/13 X |
| 5,278,662 | 1/1994 | Womach et al. | 360/13 X |
| 5,388,197 | 2/1995 | Rayner | 395/154 |

FOREIGN PATENT DOCUMENTS

| | | |
|---|---|---|
| 0077686 | 4/1983 | European Pat. Off. |
| 0 446 054 | 9/1991 | European Pat. Off. |

Primary Examiner—Aristotelis Psitos
Assistant Examiner—James T. Wilson
Attorney, Agent, or Firm—William S. Frommer; Alvin Sinderbrand

[57] ABSTRACT

To edit reproduced audio and video signals for recording onto a recording medium, the start point of a first reproduced signal, reproduced from a first playback medium, is synchronized to a first reference time. The end point of the first reproduced signal and the start point of a second reproduced signal, reproduced from a second playback medium, are synchronized to a second reference time. The end point of the second reproduced signal is synchronized to a third reference time. The start and end points of a third reproduced signal, reproduced from a third playback medium, are respectively synchronized to the first and third reference times. The first and second reproduced signals are sequentially delivered to the recording medium as a function of the first, second and third reference times, and the third reproduced signal is delivered to the recording medium as a function of the first and third reference times. The first and second reproduced signals are, for example, the video signals and the third reproduced signal is the audio signal (or vice versa).

8 Claims, 4 Drawing Sheets

F I G. 1(A) 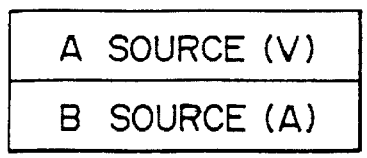
F I G. 1(B) 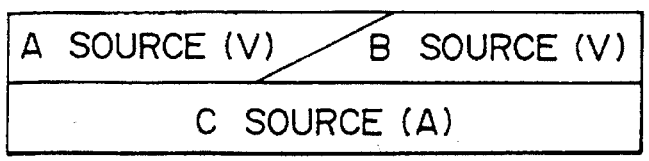
F I G. 1(C) 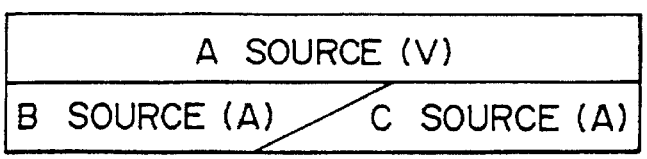
F I G. 1(D) 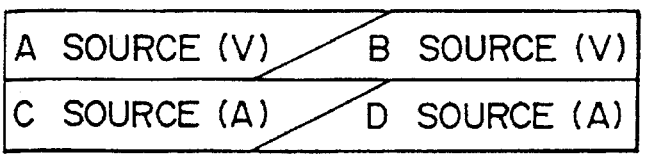
F I G. 1(E) 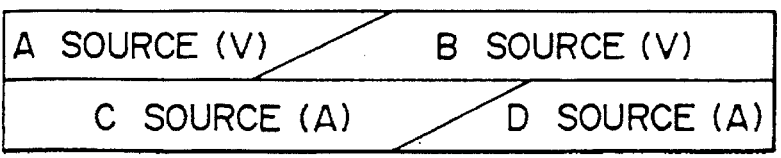

METHODS AND APPARATUS FOR EDITING AND RECORDING AUDIO AND/OR VIDEO SIGNALS REPRODUCED FROM PLURAL SOURCES

This application is a continuation of application Ser. No. 08/113,802, filed Aug. 31, 1993 now abandoned.

BACKGROUND OF THE INVENTION

The present invention relates to an editing method and apparatus.

In conventional video tape editing (electronic editing), first video and audio signals reproduced from a first VTR and second video and audio signals reproduced from a second VTR are sequentially supplied to a third VTR. The first and second video and audio signals are edited with or without entering a special effect at the editing point and are then recorded on a magnetic tape. However, the video and audio signals from a common source (such as the first or the second VTR) are always processed inseparably.

In conventional editing, therefore, when the video and audio signals of different sources are combined, the editing of the audio signals or video signals must be done first and then the remaining signals are after-recorded. Therefore, the editing operation is complex.

OBJECT AND SUMMARY OF THE INVENTION

An object of the present invention is to provide a method and apparatus for easily combining video and audio signals for editing even when the video signals and/or the audio signals are reproduced from different sources, and when after some special effect is given to the editing point(s), the video and/or audio signals are recorded onto another recording medium together.

An editing method according to the first aspect of the present invention comprises processing to give an effect to the ending portion of a first reproduced signal reproduced from a first recording medium and to the beginning portion of a second reproduced signal reproduced from a second recording medium; and sequentially recording onto a fourth recording medium the first and second reproduced signals which have been so processed with a third reproduced signal reproduced from a third recording medium. The first and second reproduced signals are one of video signals or audio signals and the third reproduced signal is the other of the audio signal or video signal.

An editing apparatus according to the second aspect of the present invention includes first, second and third reproducers. An effector processes to give an effect to the ending portion of a first reproduced signal reproduced from a first recording medium by the first reproducer and to the beginning portion of a second reproduced signal reproduced from a second recording medium by the second reproducer. A recorder sequentially records onto a fourth recording medium the first and second reproduced signals which have been so processed by the effector with a third reproduced signal reproduced from a third recording medium. An editor controls the first and second reproducers, the effector and the recorder. Both the first and second reproduced signals are video signals or audio signals, and the third reproduced signal is an audio signal or a video signal.

According to the second aspect of the invention, the ending portion of the first reproduced signal reproduced from the first recording medium by the first reproducer and the beginning portion of the second reproduced signal reproduced from the second recording medium by the second reproducer are processed by the effector to give an effect, and the first and second reproduced signals which have been so processed, and the third reproduced signal reproduced from the third recording medium are recorded onto the fourth recording medium by the recorder.

An editing method according to the third aspect of the present invention comprises processing to give an effect to the ending portion of a first reproduced signal reproduced from a first recording medium and the beginning portion of a second reproduced signal reproduced from a second recording medium; processing to give an effect the ending portion of a third reproduced signal reproduced from a third recording medium and the beginning portion of a fourth reproduced signal reproduced from a fourth recording medium; and sequentially recording onto a fifth recording medium the first and second reproduced signals which have been so processed with the third and fourth reproduced signals which have been so processed. Both the first and second reproduced signals are video signals (or audio signals) and both the third and fourth reproduced signals are audio signals (or video signals).

An editing apparatus according to the fourth aspect of the present invention includes first, second, third and fourth reproducers. A first effector processes to give an effect the ending portion of a first reproduced signal reproduced from a first recording medium by the first reproducer and the beginning portion of a second reproduced signal reproduced from a second recording signal reproduced from a second recording medium by the second reproducer. A second effector processes to give an effect the ending portion of a third reproduced signal reproduced from a third recording medium by the third reproducer and the beginning portion of a fourth reproduced signal reproduced from a fourth recording medium by the fourth reproducer. A recorder sequentially records onto a fifth recording medium the first and second reproduced signals which have been so processed by the first effector and the third and fourth reproduced signals which have been so processed by the second effector. An editor controls the first, second, third and fourth reproducers. Both the first and second reproduced signals are video signals, and both the third and fourth reproduced signals are audio signals.

According to the fourth aspect of the present invention, the ending portion of the first reproduced signal reproduced from the first recording medium by the first reproducer and the beginning portion of the second reproduced signal reproduced from the second recording medium by the second reproducer are processed by the first effector to give an effect. The ending portion of the third reproduced signal reproduced from the third recording medium by the third reproducer and the beginning portion of the fourth reproduced signal reproduced from the fourth recording medium by the fourth reproducer are processed by the second effector to give an effect. The recorder sequentially records onto the fifth recording medium the first and second reproduced signals which have been so processed by the first effector and the third and fourth reproduced signals which have been so processed by the second effector. The editor controls the first, second, third and fourth reproducers, the first and second effectors, and the recorder.

BRIEF DESCRIPTION OF THE DRAWINGS

FIG. 1(A)–1(E) show various modes of editing used in an embodiment of the present invention;

DETAILED DESCRIPTION OF THE PREFERRED EMBODIMENTS OF THE INVENTION

Figure 2:
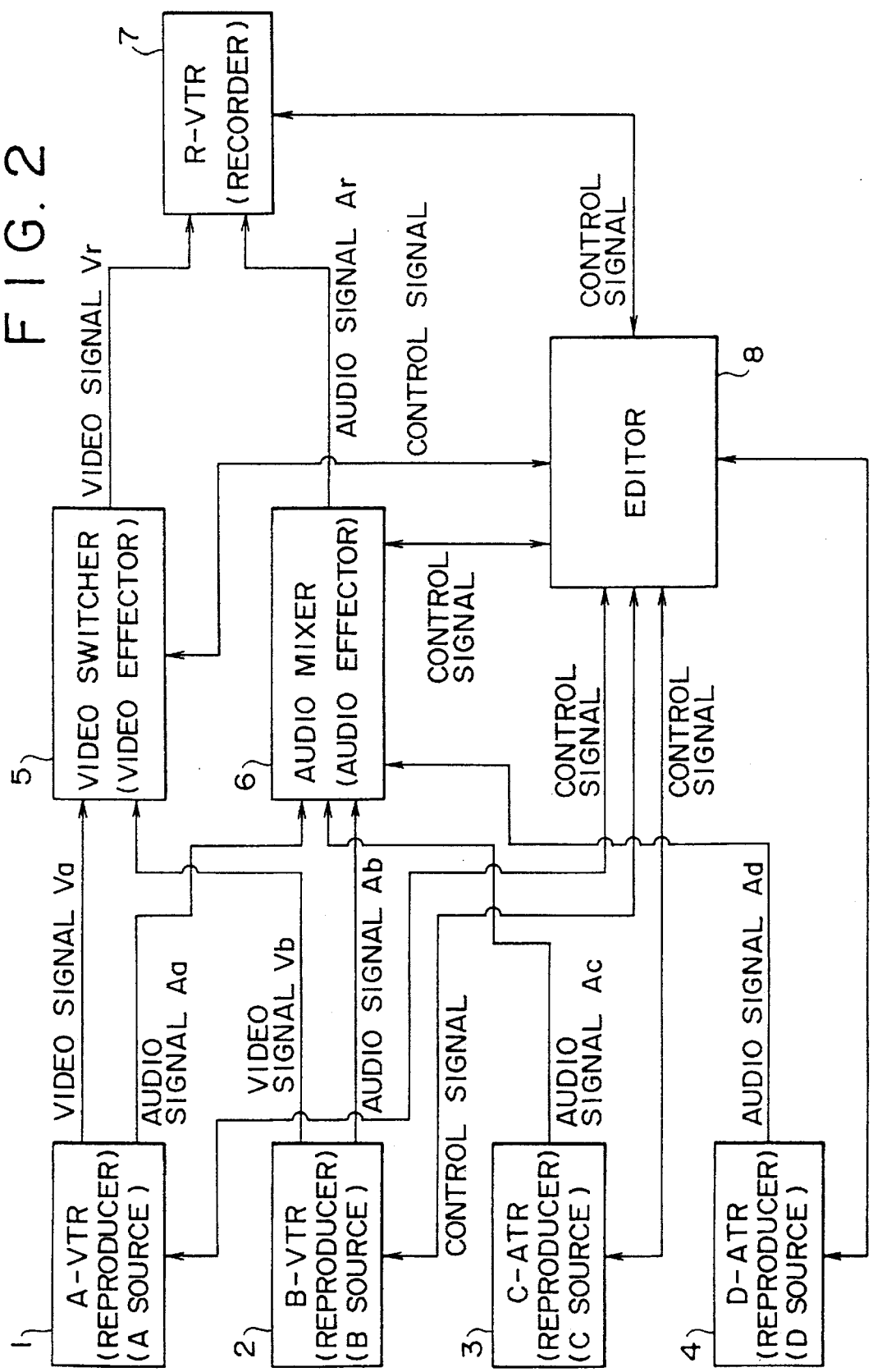
FIG. 2 is a block diagram showing an editing apparatus according to the embodiment of FIG. 1.

Referring to drawings, several embodiments of the present invention will be explained, hereinafter. FIG. 2 shows an editing apparatus for performing A/B roll editing. An A-VTR 1, namely a video tape recorder, reproduces a video signal Va and an audio signal Aa from a magnetic tape. These signals are hereinafter referred to as an A source. The reproduced video and audio signals Va and Aa are respectively supplied to a video switcher (a video effector) 5 and an audio mixer (an audio effector) 6. A B-VTR 2, namely a video tape recorder, reproduces a video signal V band and an audio signal Ab from a magnetic tape. These signals are hereinafter referred to as a B source. The reproduced video and audio signals Vb and Ab are respectively supplied to the video switcher (the video effector) 5 and the audio mixer (the audio effector) 6. A C-ATR 3, namely a tape recorder having a stationary magnetic head or a rotary magnetic head, reproduces an audio signal Ac from a magnetic tape. This signal is hereinafter referred to as the C source. The reproduced audio signal Ac is supplied to the audio mixer (the audio effector) 6. A D-ATR 4, namely a tape recorder having a stationary magnetic head or a rotary magnetic head, reproduces an audio signal Ad from a magnetic tape. This signal is hereinafter referred to as D the source. The reproduced audio signal Ad is supplied to the audio mixer (audio effector) 6. A video signal Vr is derived from video switcher 5 and an audio signal Ar is derived from audio mixer 6. The video and audio signals Vr and Ar are supplied to a R-VTR 7 for recording and are thereby edited. An editor 8, which includes a micro-computer, controls the above components 1–7 by supplying control signals to each component, respectively.

An editing operation will now be described with reference to FIG. 1.

FIG. 1(A) shows a simultaneous recording of the video signal supplied by the A source and the audio signal supplied by the B source using the recording VTR 7 such that the respective cut-in points and cut-out points of the audio and video signals are aligned on a magnetic tape. The cut-in points need not be aligned.

FIG. 1(B) shows sequential recording of the video signals supplied by the A and B sources simultaneously with recording of the audio signal (A) supplied by the C source in which after the ending portion of the video signal of the A source and the beginning portion of the video signal of the B source are processed. A fade-in/fade-out effect is given here by supplying the processed video signals with the audio signal of the C source to the recording VTR 7 such that their respective cut-in points and cut-out points are aligned on a magnetic tape. The cut-in points need not be aligned.

FIG. 1(C) shows recording of the video signal (v) of the A source simultaneously with the sequential recording of the audio signals (A) supplied by the B and C sources in which the ending portion of the audio signal of B source and the beginning portion of the audio signal of C source are processed. A fade-in/fade-out effect is given here by supplying the video signal of the A source together with the processed audio signals to recording VTR 7 such that their respective cut-in points and cutout points are aligned on a magnetic tape. The cut-in points need not be aligned.

FIG. 1(D) shows sequential recording of the video signals supplied by the A and B sources simultaneously with the sequential recording of the audio signals (A) supplied by the C and D sources in which the ending portion of the video signal of the A source and the beginning portion of the video signal of the B source are processed, and the ending portion of the audio signal supplied by the C source as the beginning of the audio signal supplied by the D source are processed. A fade-in/fade-out effect is given here by supplying the video signals of the A and B sources together with the processed audio signals of the C and D sources in their respective orders to the recording VTR 7 such that their respective cut-in points and cut-out points are aligned on the magnetic tape. The cut-in points need not be aligned.

FIG. 1(E) shows a sequential recording of the video signals (V) supplied by the A and B sources simultaneously with sequential recording of the audio signals (A) supplied by the C and D sources in which the ending portion of the video signal of the A source and the beginning of the video signal of the B source are processed and, at a different time, the ending portion of the audio signal of C source and the beginning portion of the audio signal of D source are processed. A fade-in/fade-out effect is given here by supplying the processed video signals of the A and B sources with the processed audio signals of the C and D sources in their respective orders to the recording VTR 7 such that their respective cut-in points and cut-out points are aligned on the magnetic tape. The cut-in points need not be aligned.

Figure 3:
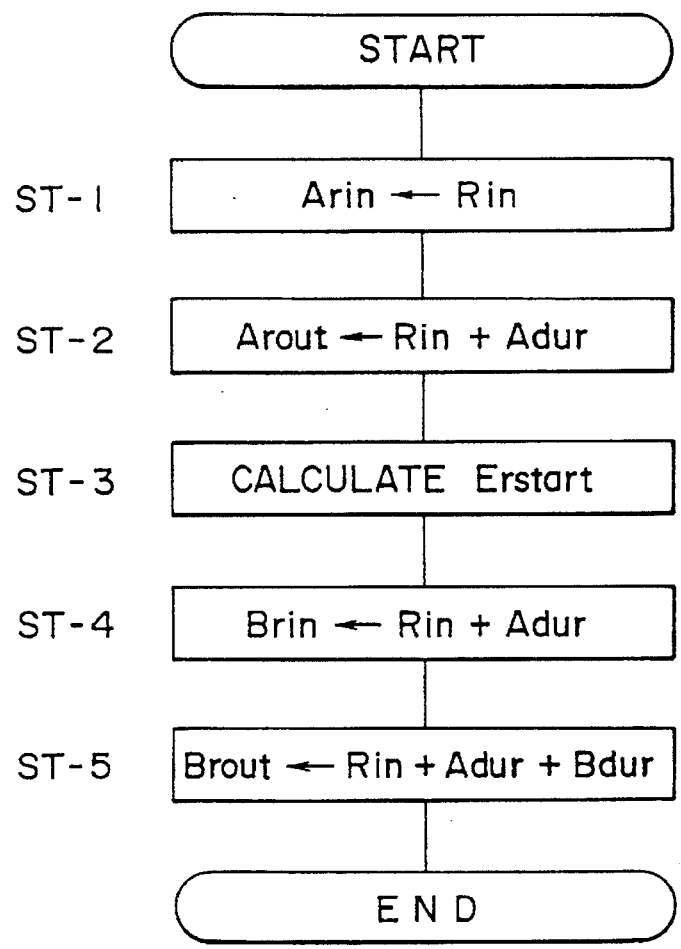
FIG. 3 is a flow-chart referred to in describing editing of video signals according to the embodiment of FIG. 1.
Figure 4:
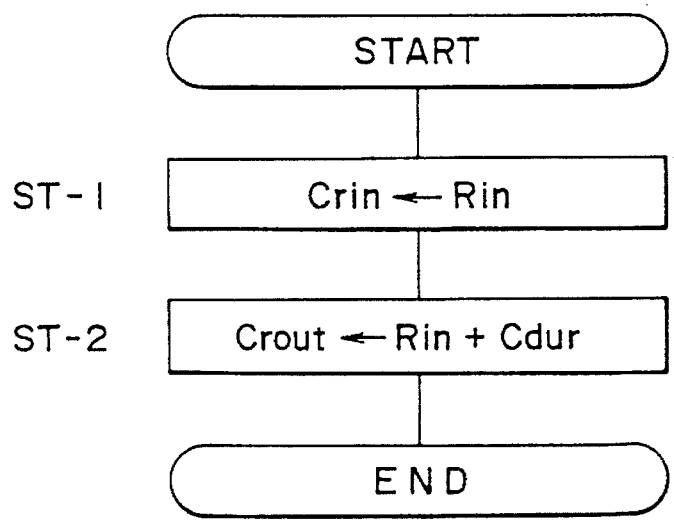
FIG. 4 is a flow-chart referred to in describing the editing audio signals according to the embodiment of FIG. 1.

Using the case of FIG. 1(B) as an example, a detail of editing video and audio signals will be described with reference to the flow-charts shown in FIGS. 3 and 4.

An editing data set employed by an operator using editor 8 includes information that the video signal source changes from the A source to the B source (A/B roll) and that an audio signal source is the C source. The editing data set also includes the following information:

In-point and out-point of the A source: $A_{in}$, $A_{out}$.

In-point and out-point of the B source: $B_{in}$, $B_{out}$.

In-point and out-point of the C source: $C_{in}$, $C_{out}$.

In-point and out-point of the recording VTR 7 : $R_{in}$, $R_{out}$.

Transitional period during which video signals change from the A source to the B source: Trans.

The editor 8 calculates the editing data, namely a starting point of the effect processing, that is, the time at which video signals start to change from the A source to the B source. There are several ways to calculate the data. In the present invention, it is assumed that the starting point of the effect processing is the point $E_{start}$.

The in-points and out-points of the A, B and C sources are converted onto a reference time axis used for the magnetic tape in the recording VTR 7 as follows:

$A_{in} \rightarrow A_{rin}$, $A_{out} \rightarrow A_{rout}$, $B_{in} \rightarrow B_{rin}$, $B_{out} \rightarrow B_{rout}$, $C_{in} \rightarrow C_{rin}$, $C_{out} \rightarrow C_{rout}$ The durations of the A, B and C sources, namely $A_{dur}$, $B_{dur}$ and $C_{dur}$, are expressed as the following equations:

$$A_{dur} = A_{out} - A_{in}, \quad B_{dur} = B_{out} - B_{in}, \quad C_{dur} = C_{out} - C_{in}$$

First, referring to FIG. 3, the steps of editing the video signals will be described.

Step ST-1: Make $A_{in}$ coincide with $A_{rin}$.

Step ST-2: Make the sum of $A_{rin}$ and $A_{dur}$ (or the sum of $R_{in}$ and $A_{dur}$) coincide with $A_{rout}$.

Step ST-3 : Set the starting points of the effect to be $E_{start}$ ($E_{start}=Ar_{out}=R_{in}+A_{dur}$, for example)

Step ST-4 : Because the out-point $A_{out}$ of the A source coincides with the in-point $B_{in}$ of the B source:

$$B_{rin}=A_{rout}=R_{in}+A_{dur}$$

Step ST-5: Make the sum of $B_{rin}$ and $B_{dur}$, that is, the sum of $R_{in}$, $A_{dur}$ and $B_{dur}$, coincident with $B_{rout}$ ($B_{rout}=R_{out}$).

Next, referring to FIG. 4, steps of editing the audio signals will be described.

Step ST-1: Make the in-point $R_{in}$ of the recording VTR coincident with the in-point $C_{in}$ of the C source.

Step ST-2: Make the sum of the in-point $R_{in}$ of the recording VTR and the duration $C_{dur}$ of the C source with the out-point $C_{rout}$ of the C source.

Figure 5:
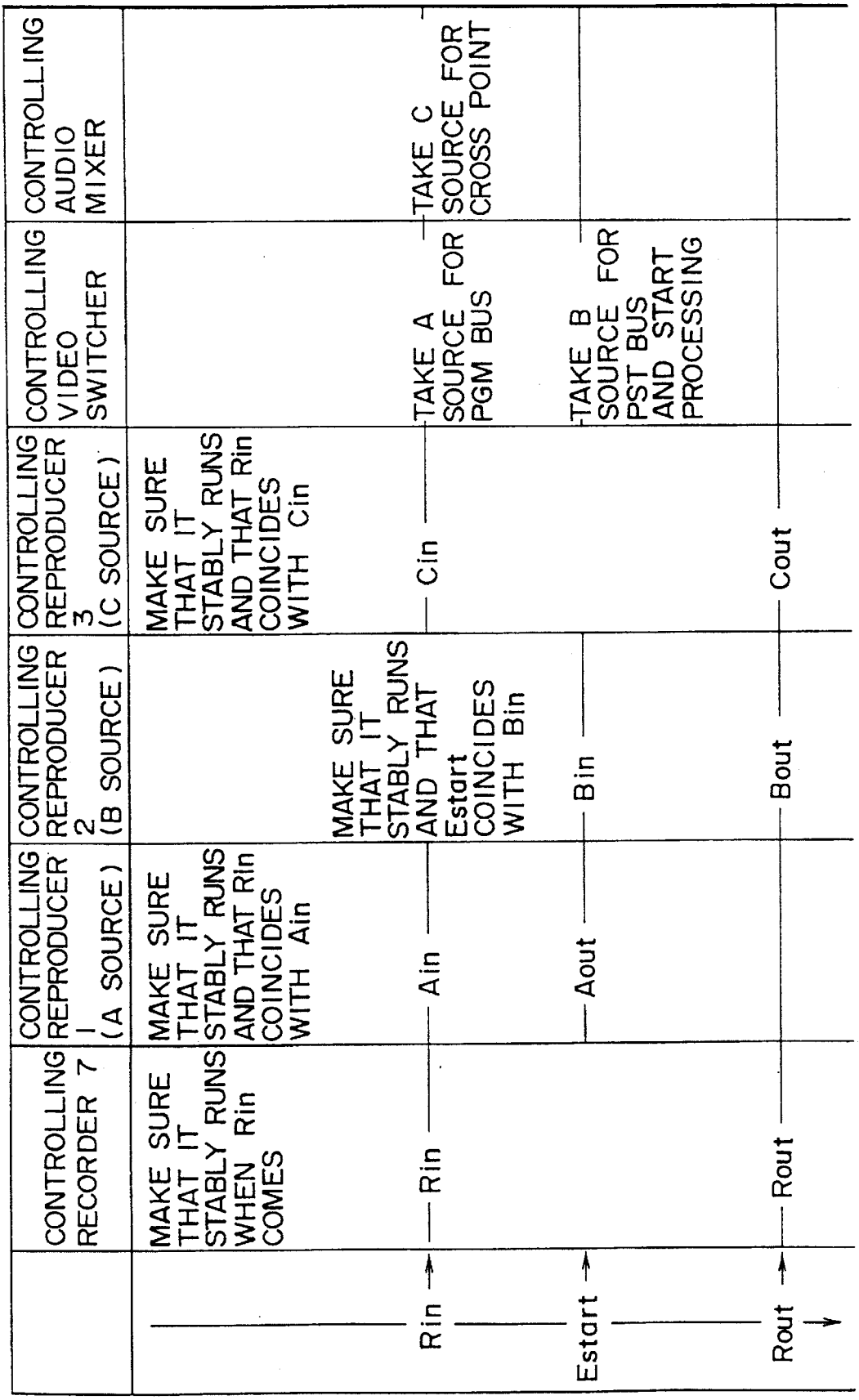
FIG. 5 is a table showing control and synchronization operations by an editor at each timings according to the embodiment of FIG. 1.

The control operation of the editor 8 of the respective components in the editing shown in FIG. 1 (B) will now be described with reference to FIG. 5.

1. The R-VTR 7, the A-VTR 1 and the C-ATR 3 are controlled so that when the in-point of the R-VTR 7 is reached, the in-point $R_{in}$ of the R-VTR, the in-point $A_{in}$ of the A source and the in-point $C_{in}$ of the C source are also reached. The video switcher 5 is controlled so that it takes the A source for a cross-point when the in-point $R_{in}$ of the R-VTR arrives. The audio mixer 6 is controlled so that it takes C source for a cross-point when the in-point $R_{in}$ of the R-VTR arrives.

2. The B-VTR 2 is controlled so that when the point $R_{in}+A_{dur}$ comes, the in-point $B_{in}$ of the B source arrives. The video switcher 5 is controlled so that it takes the B source for a cross-point when the point $R_{in}+A_{dur}$ arrives. The switcher 5 then starts processing to effect a change from the A source to the B source. A conventional video switcher has a PGM bus and a PST bus so that in A/B roll editing, it takes the A source for the PGM bus and B source for the PST bus and starts the processing to give an effect.

In an editing method and apparatus according to the above-explained present invention, when the video signals or the audio signals reproduced from different recording media are connected with each other after being processed to give an effect and are recorded onto another recording medium, the video signals and audio signals from different sources are easily combined and edited.

What is claimed is:

1. An automated editing method for editing video/audio signals automatically onto a recording medium comprising the steps of:

automatically synchronizing a start point of a first reproduced signal reproduced from said video/audio signals recorded on a first playback medium to a first reference time of said recording medium;

automatically synchronizing an end point of said first reproduced signal and a start point of a second reproduced signal reproduced from said video/audio signals recorded on a second playback medium to a second reference time of said recording medium thereby defining a first duration between the start and end points of said first reproduced signal, the second reference time being later in time than said first reference time;

automatically synchronizing an end point of said second reproduced signal to a third reference time of said recording medium thereby defining a second duration between the start and end points of said second reproduced signal, the third reference time being later in time than said second reference time;

automatically synchronizing a start point of a third reproduced signal reproduced from said video/audio signals recorded on a third playback medium to said first reference time of said recording medium;

automatically synchronizing an end point of said third reproduced signal to said third reference time of said recording medium thereby defining a third duration between the start and end points of said third reproduced signal;

automatically setting the end point of said first reproduced signal and said start point of said second reproduced signal such that a sum of said first and second durations equals the third duration of said third reproduced signal;

seguentially delivering said first and second reproduced signals to said recording medium as a function of said first, second and third reference times such that said first reproduced signal is delivered from said first reference time substantially until said second reference time and said second reproduced signal is delivered substantially from said second reference time until said third reference time;

delivering said third reproduced signal to said recording medium concurrent with the seguential delivery of said first and second reproduced signals so that said third reproduced signal is delivered from said first reference time until said third reference time; and recording said first and second reproduced signals simultaneously with said third reproduced signal onto said recording medium, said first and second reproduced signals being one of video signals and audio signals and said third reproduced signal being another of said audio signals and said video signals.

2. An automated editing apparatus for editing video/audio signals automatically onto a recording medium comprising:

first, second and third reproducing means;

means for automatically synchronizing a start point of a first reproduced signal reproduced from said video/audio signals recorded on a first playback medium by said first reproducing means to a first reference time of said recording medium;

means for automatically synchronizing an end point of said first reproduced signal and a start point of a second reproduced signal reproduced from said video/audio signals recorded on a second playback medium by said second reproducing means to a second reference time of said recording medium thereby defining a first duration between the start and end points of said first reproduced signal, the second reference time being later in time than said first reference time;

means for automatically synchronizing an end point of said second reproduced signal to a third reference time of said recording medium thereby defining a second duration between the start and end points of said second reproduced signal, the third reference time being later in time than said second reference time;

means for automatically synchronizing a start point of a third reproduced signal reproduced from said video/audio signals recorded on a third playback medium by said third reproducing means to said first reference time of said recording medium;

means for automatically synchronizing an end point of said third reproduced signal to said third reference time of said recording medium thereby defining a third duration between the start and end points of said third reproduced signal;

automatically setting the end point of said first reproduced signal and said start point of said second reproduced signal such that a sum of said first and second durations equals the third duration of said third reproduced signal;

recording means for recording said first and second reproduced signals simultaneously with said third reproduced signal onto said recording medium, said first and second reproduced signals being one of video signals and audio signals and said third reproduced signal being another of said audio signals and said video signals;

first delivery means for sequentially delivering said first and second reproduced signals to said recording means as a function of said first, second and third reference times such that said first reproduced signal is delivered from said first reference time substantially until said second reference time and said second reproduced signal is delivered substantially from said second reference time until said third reference time;

second delivery means for delivering said third reproduced signal to said recording means concurrent with the sequential delivery of said first and second reproduced signals so that said third reproduced signal is delivered from said first reference time until said third reference time; and control means for controlling the operation of said first and second delivery means and said recording means.

3. An automated editing method for editing video/audio signals automatically onto a recording medium comprising the steps of:

automatically synchronizing a start point of a first reproduced signal reproduced from said video/audio signals recorded on a first playback medium to a first reference time of said recording medium;

automatically synchronizing an end point of said first reproduced signal and a start point of a second reproduced signal reproduced from said video/audio signals recorded on a second playback medium to a second reference time of said recording medium thereby defining a first duration between the start and end points of said first reproduced signal, the second reference time being later in time than said first reference time;

automatically synchronizing an end point of said second reproduced signal to a third reference time of said recording medium thereby defining a second duration between the start and end points of said second reproduced signal, the third reference time being later in time than said second reference time;

automatically synchronizing a start point of a third reproduced signal reproduced from said video/audio signals recorded on a third playback medium to said first reference time of said recording medium;

automatically synchronizing an end point of said third reproduced signal and a start point of a fourth reproduced signal reproduced from said video/audio signals recorded on a fourth playback medium to a fourth reference time of said recording medium thereby defining a third duration between the start and end points of said third reproduced signal, the fourth reference time being later in time than said first reference time;

automatically synchronizing an end point of said fourth reproduced signal to said third reference time of said recording medium thereby defining a fourth duration between the start and end points of said fourth reproduced signal;

automatically setting the end point of said first reproduced signal and said start point of said second reproduced signal such that a sum of said first and second durations equals both the third duration of said third reproduced signal and the fourth duration of said fourth reproduced signal;

sequentially delivering said first and second reproduced signals to said recording medium as a function of said first, second and third reference times such that said first reproduced signal is delivered from said first reference time substantially until said second reference time and said second reproduced signal is delivered substantially from said second reference time until said third reference time;

sequentially delivering said third and fourth reproduced signals to said recording medium concurrent with the sequential delivery of said first and second reproduced signals and as a function of said first, third and fourth reference times such that said third reproduced signal is delivered from said first reference time substantially until said fourth reference time and said fourth reproduced signal is delivered substantially from said fourth reference time until said third reference time; and recording said first and second reproduced signals simultaneously with said third and fourth reproduced signals onto said recording medium, said first and second reproduced signals being one of video signals and audio signals and said third and fourth reproduced signals being another of said audio signals and said video signals.

4. A method according to claim 3, wherein said second and fourth reference times coincide.

5. A method according to claim 3, wherein said second and fourth reference times are different.

6. An automated editing apparatus for editing video/audio signals automatically onto a recording medium comprising:

first, second, third and fourth reproducing means;

means for automatically synchronizing a start point of a first reproduced signal reproduced from said video/audio signals recorded on a first playback medium by said first reproducing means to a first reference time of said recording medium;

means for automatically synchronizing an end point of said first reproduced signal and a start point of a second reproduced signal reproduced from said video/audio signals recorded on a second playback medium by said second reproducing means to a second reference time of said recording medium thereby defining a first duration between the start and end points of said first reproduced signal, the third reference, the second reference time being later in time than said first reference time;

means for automatically synchronizing an end point of said second reproduced signal to a third reference time of said recording medium thereby defining a second duration between the start and end points of said second reproduced signal, the third reference time being later in time than said second reference time;

means for automatically synchronizing a start point of a third reproduced signal reproduced from said video/audio signals recorded on a thrid playback medium by said third reproducing means to said first reference time of said recording medium;

means for automatically synchronizing an end point of said third reproduced signal and a start point of a fourth reproduced signal reproduced from said video/audio signals recorded on a fourth playback medium by said fourth reproducing means to a fourth reference time of said recording medium thereby defining a third duration between the start and end points of said third reproduced signal, the fourth reference time being later in time than said first reference time;

means for automatically synchronizing an end point of said fourth reproduced signal to said third reference time of said recording medium thereby defining a fourth duration between the start and end points of said fourth reproduced signal;

automatically setting the end point of said first reproduced signal and said start point of said second reproduced signal such that a sum of said first and second durations equals both the third duration of said third reproduced signal and the fourth duration of said fourth reproduced signal;

recording means for recording said first and second reproduced signals simultaneously with said third and fourth reproduced signals onto said recording medium, said first and second reproduced signals being one of video signals and audio signals and said third and fourth reproduced signal being another of said audio signals and said video signals; first delivery means for sequentially delivering said first and second reproduced signals to said recording means as a function of said first, second and third reference times such that said first reproduced signal is delivered from said first reference time substantially until said second reference time and said second reproduced signal is delivered substantially from said second reference time until said third reference time;

second delivery means for sequentially delivering said third and fourth reproduced signals to said recording medium concurrent with the sequential delivery of said first and second reproduced signals and as a function of said first, third and fourth reference times such that said third reproduced signal is delivered from said first reference time substantially until said fourth reference time and said fourth reproduced signal is delivered substantially from said fourth reference time until said third reference time;

control means for controlling the operation of said first and second delivery means and said recording means.

7. An apparatus according to claim 6, wherein said second and fourth reference times coincide.

8. An apparatus according to claim 6, wherein said second and fourth reference times are different.

* * * * *